(12) United States Patent
Sandburg

(10) Patent No.: US 7,796,330 B2
(45) Date of Patent: Sep. 14, 2010

(54) ANTI-SPECKLING LASER REAR-PROJECTION SCREEN STRUCTURE AND METHODOLOGY

(75) Inventor: Edmund Sandburg, Montesereno, CA (US)

(73) Assignee: High Definition Integration, Ltd., Grand Cayman (KY)

( * ) Notice: Subject to any disclaimer, the term of this patent is extended or adjusted under 35 U.S.C. 154(b) by 227 days.

(21) Appl. No.: 11/985,193

(22) Filed: Nov. 13, 2007

(65) Prior Publication Data

US 2008/0117505 A1 May 22, 2008

Related U.S. Application Data

(60) Provisional application No. 60/859,769, filed on Nov. 16, 2006, provisional application No. 60/926,381, filed on Apr. 25, 2007.

(51) Int. Cl.
*G03B 21/56* (2006.01)
(52) U.S. Cl. .................. 359/446; 359/460
(58) Field of Classification Search .......... 359/444–446
See application file for complete search history.

(56) References Cited

U.S. PATENT DOCUMENTS

| | | | | |
|---|---|---|---|---|
| 3,125,927 A * | 3/1964 | Erban | .................. | 359/446 |
| 3,640,602 A * | 2/1972 | Wolfe | .................. | 359/446 |
| 4,143,943 A * | 3/1979 | Rawson | .................. | 359/446 |
| 4,317,618 A * | 3/1982 | Murakoshi | .................. | 359/446 |
| 4,390,239 A * | 6/1983 | Huber | .................. | 359/446 |
| 5,760,955 A * | 6/1998 | Goldenberg et al. | .................. | 359/456 |
| 2007/0171521 A1* | 7/2007 | Sugawara et al. | .................. | 359/443 |
| 2007/0247707 A1* | 10/2007 | Michimori et al. | .................. | 359/446 |
| 2008/0007827 A1* | 1/2008 | Kinoshita et al. | .................. | 359/446 |
| 2008/0037117 A1* | 2/2008 | Seki et al. | .................. | 359/446 |

OTHER PUBLICATIONS

Rawson et al, "A Speckle Free Rear Projection Screen Using Two Close Screens in Slow Relative Motion", J. Optical Society of America, 66, 1290-1294 (1976).*

* cited by examiner

*Primary Examiner*—Christopher E Mahoney
*Assistant Examiner*—Leon W Rhodes
(74) *Attorney, Agent, or Firm*—Sterne, Kessler, Goldstein & Fox P.L.L.C.

(57) ABSTRACT

A rear-projection screen structure, and an associated method, for creating on the front, image-viewing side of a rear-projection screen structure an anti-speckled, rear-projected, laser-beam image. Methodologically, and as implemented by the structure of the invention, the invention steps include projecting a source laser-image beam toward the rear side of such a screen structure, and while so projecting, introducing relative-motion optical diffusion in the laser beam path which exists between the source laser-image beam and the screen-structure's image-viewing side.

17 Claims, 4 Drawing Sheets

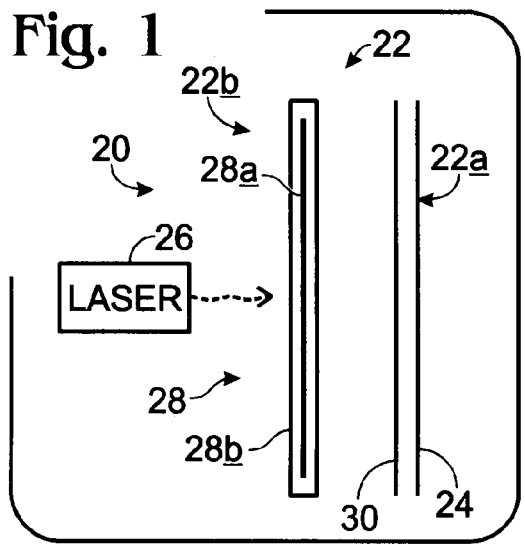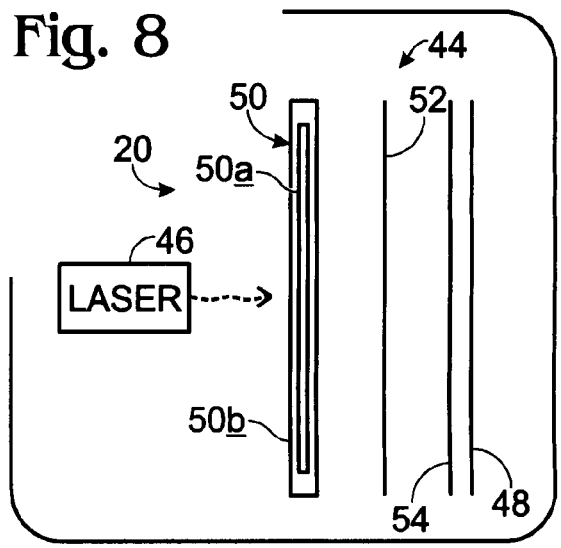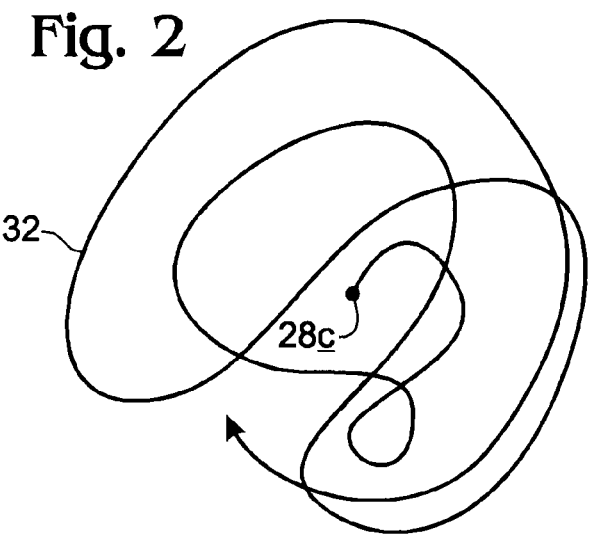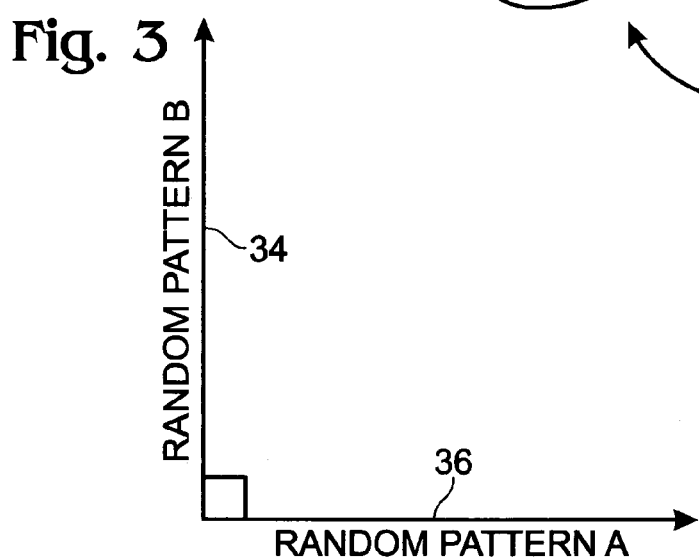

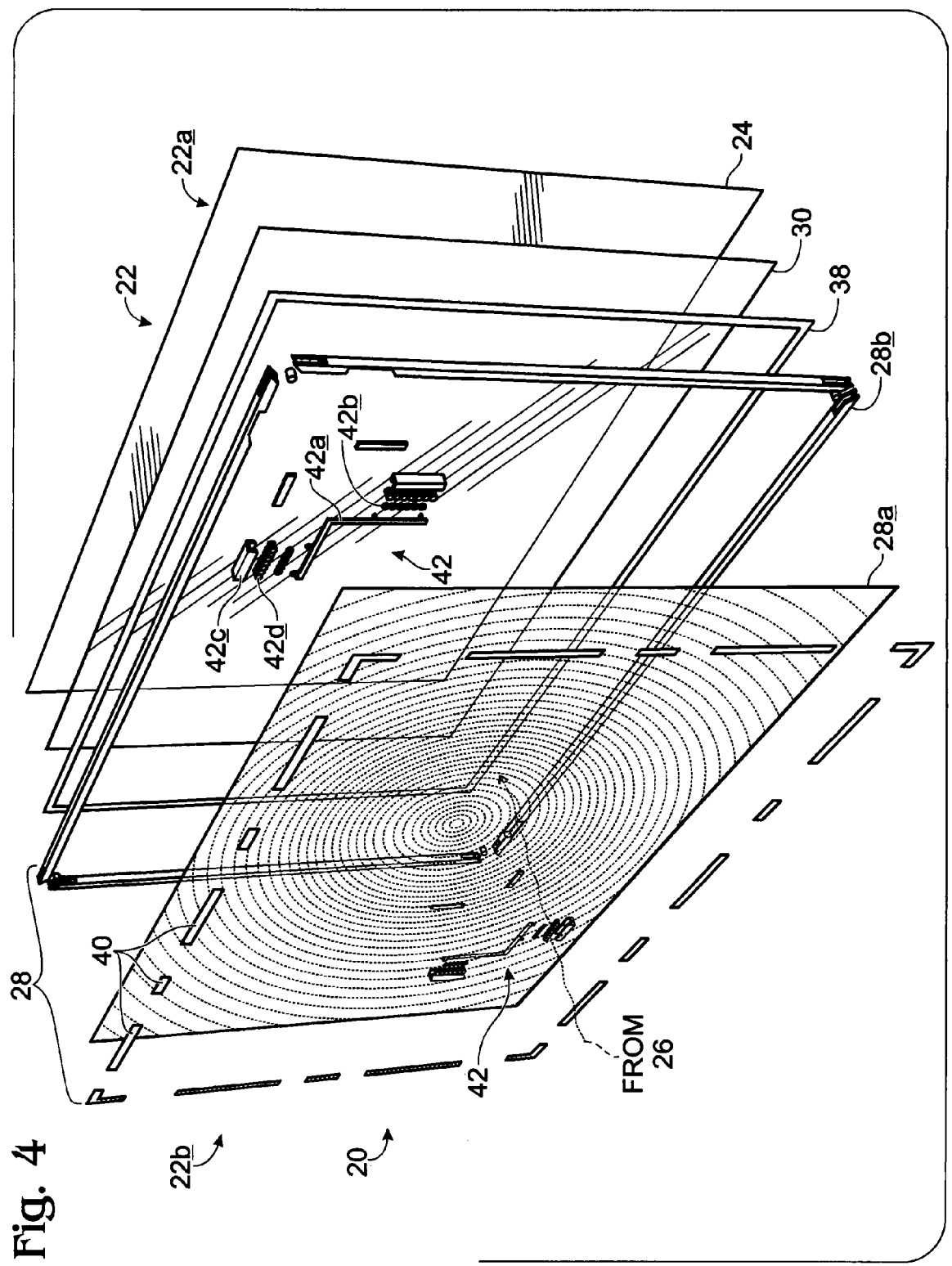

ANTI-SPECKLING LASER REAR-PROJECTION SCREEN STRUCTURE AND METHODOLOGY

CROSS REFERENCES TO RELATED APPLICATIONS

This application claims filing date priorities to two previously filed, currently U.S. Provisional Patent Applications, Ser. Nos. 60/859,769, filed Nov. 16, 2006, for "Laser Projection Screen Structure," and 60/926,381, filed Apr. 25, 2007, for "Laser Projection Screen Structure." The entire disclosure contents of these two, prior-filed Provisional Patent Applications are hereby incorporated herein by reference.

BACKGROUND AND SUMMARY OF THE INVENTION

A familiar problem which is associated with a laser-generated screen image, such as a laser-generated television screen image, is the problem known as speckling, a condition which creates small points of sparkling/twinkling optical behavior which can be extremely distracting and unpleasant. The existence of this speckling problem stands somewhat in the way of successful and acceptable utilization of laser-projection technology to create viewable screen images.

Accordingly, the present invention has undertaken as its focus an effort, which has turned out to be an extremely successful effort, to eliminate, substantially completely, this speckling problem. It has done so by proposing a unique form of a relative-motion optical diffusion screen structure—presented herein in the specific form of a rear-projection screen structure—which functions in an extremely simple fashion to de-speckle (i.e., to anti-speckle) a laser-generated rear-projection image with a very high degree of anti-speckling success. This image is one which is forwardly projected in a laser beam along an appropriate optical beam path extending forwardly from a rearwardly disposed laser-imagery source, i.e., such a source which is disposed to the rear of the rear side of the proposed screen structure, with this path effectively including one of several different embodiments of relative-motion optical diffusion structure. It should be understood at this point that, wherever the term "diffusion" is employed herein, this term is intended to refer to optical diffusion.

Fundamentally, and as was just suggested, the invention rests upon the discovery that placement and operation, in the optical projection path lying between a laser-imagery source and the front, image-viewing side of a viewing screen, of at least one of what is referred to herein as a relative-motion optical diffusion screen, or lens, element (called herein a relative-motion optical diffusion structure), effectively removes, from perception in the viewed projection image, any evidence of the above-mentioned, traditional laser speckling problem.

In the description of the present invention, the structure specifically employed within the realm of a screen structure, and the methodology associated with the operation of this structure, are referred to, as indicated above, utilizing the terminology "relative-motion diffusion". In the description of the present invention, the phrase "relative-motion diffusion" is intended to refer, in its simplest form, to the creation of motion in a diffusion element which lies in the path of laser beam imagery projection so as to move, in a sense generally transversely, relative to what might be thought of as being the projection-path beam "axis" of laser imagery. In other words, this relative-motion concept involves transverse relative motion, across the path of transmission of a laser image beam, of an optical diffusion lens, or screen, element. This relative-motion diffusion approach also includes so moving such a diffusion element additionally in relation to a second, stationary diffusion element which also lies in a laser-image projection path.

The invention further offers as a feature a special, and somewhat different, practice of double diffusion in the projection path of a laser-imagery beam, with respect to which at least one, unitary, double-diffusion-creating structural element is a motion element, the motion in which produces the behavior referred to above as relative-motion diffusion. This double-diffusion element may, in certain applications, augmentively cooperate with one or more additional diffusion elements also disposed in the path of laser-image projection.

While there are various ways, or approaches, in which the structure and methodology of this invention may specifically be implemented, two very successful, and therefore preferred, such approaches are described herein. In one of these approaches, interposed the front, image-viewing side of the screen structure and the employed laser source, are two optical diffusion lenses, or screens, including, slightly spaced apart, a Fresnel lens, or screen, element, which is a relative-motion element, and disposed toward the viewing screen from the Fresnel lens element, a lenticular lens, or screen, element which is fixed in position, i.e., not relatively movable, with regard to a laser-projection beam.

The second especially interesting and herein disclosed embodiment of the present invention involves a single, double-diffusion screen, or lens element, which has two different kinds of diffusion surfaces formed respectively on its opposite faces. One of these diffusion surfaces, and specifically the surface which is the closest to the laser-projection source, is a Fresnel-formed surface. The other surface, which is more closely adjacent the viewing screen side of things, so-to-speak, is formed as a lenticular structure. This entire, unitary, double-diffusion element is itself the element which moves in a relative-motion fashion with respect to the projection path of a laser-imagery beam, and thus provides a structure with respect to which two diffusion surfaces, slightly spaced apart, both move relative to the path of laser-beam projection. This double-diffusion, unitary element may be incorporated in a screen structure which additionally includes an even greater number of non-relative-motion diffusion lenses, or screens, and more will be said about this arrangement in the detailed description of the invention which is set forth below.

With respect to effective relative motion which functions to eliminate, essentially entirely, the laser speckling problem, this motion preferably is a continuous and random motion, occurring in an infinite variety of directions, with each point of motion in a moving diffusion element essentially "orbiting" irregularly about a nominal, stationary position. Motor structure, preferably electrically energized, which is operatively incorporated into the projection screen structure of the invention, is energized in accordance with practice of the invention to create such random, "orbiting" relative motion, which motion is preferably completely non-angular in nature, in the sense that it is not characterized with any sharp transition points, or with any points of motion stoppage.

These and other important features and advantages which are attained by the present invention will now become more fully apparent as the detailed description which follows is read in conjunction with the accompanying drawings.

DESCRIPTION OF THE DRAWINGS

FIG. 1 is a very simplified and schematic side elevation, in a somewhat laterally exploded form, generally illustrating one preferred embodiment of a rear-projection screen structure usable in conjunction with a rear-projection laser-imagery source, and operating in accordance with the relative-motion optical diffusion practice of the present invention.

FIG. 2 is a stylized drawing illustrating a representative portion of a path followed by point on a relative-motion diffusion element during operation of the screen structure of FIG. 1 to de-speckle a laser-projected, rear-projection image created by the structure of FIG. 1.

FIG. 3 is an orthogonal vector diagram generally illustrating orthogonal electrical-potential vectors which operate with random amplitude control for each vector to generate random-motion driving forces to create a relative-motion pattern like that which is pictured schematically in FIG. 2.

FIG. 4 is an exploded, perspective view, somewhat fragmented, illustrating specific examples of structural screen elements and motor drive structure employable to form a relative-motion rear-projection screen structure such as that shown schematically in FIG. 1.

FIG. 7 is an enlarged, fragmentary, cross-sectional view taken generally along the line 7-7 in FIG. 5.

FIG. 8 is similar to FIG. 1, and illustrates another preferred structural embodiment of a relative-motion, rear-projection, laser-imagery-sourced screen structure made in accordance with the invention. This embodiment is made in accordance with that style of the invention, discussed earlier herein, which utilizes a unitary, generally planar, double-diffusion element which is formed with different kinds of diffusion surfaces on its opposite faces.

FIG. 9 relates to FIG. 8 in the same manner that FIG. 4 relates to FIG. 1.

DETAILED DESCRIPTION OF THE INVENTION

Figure 6:
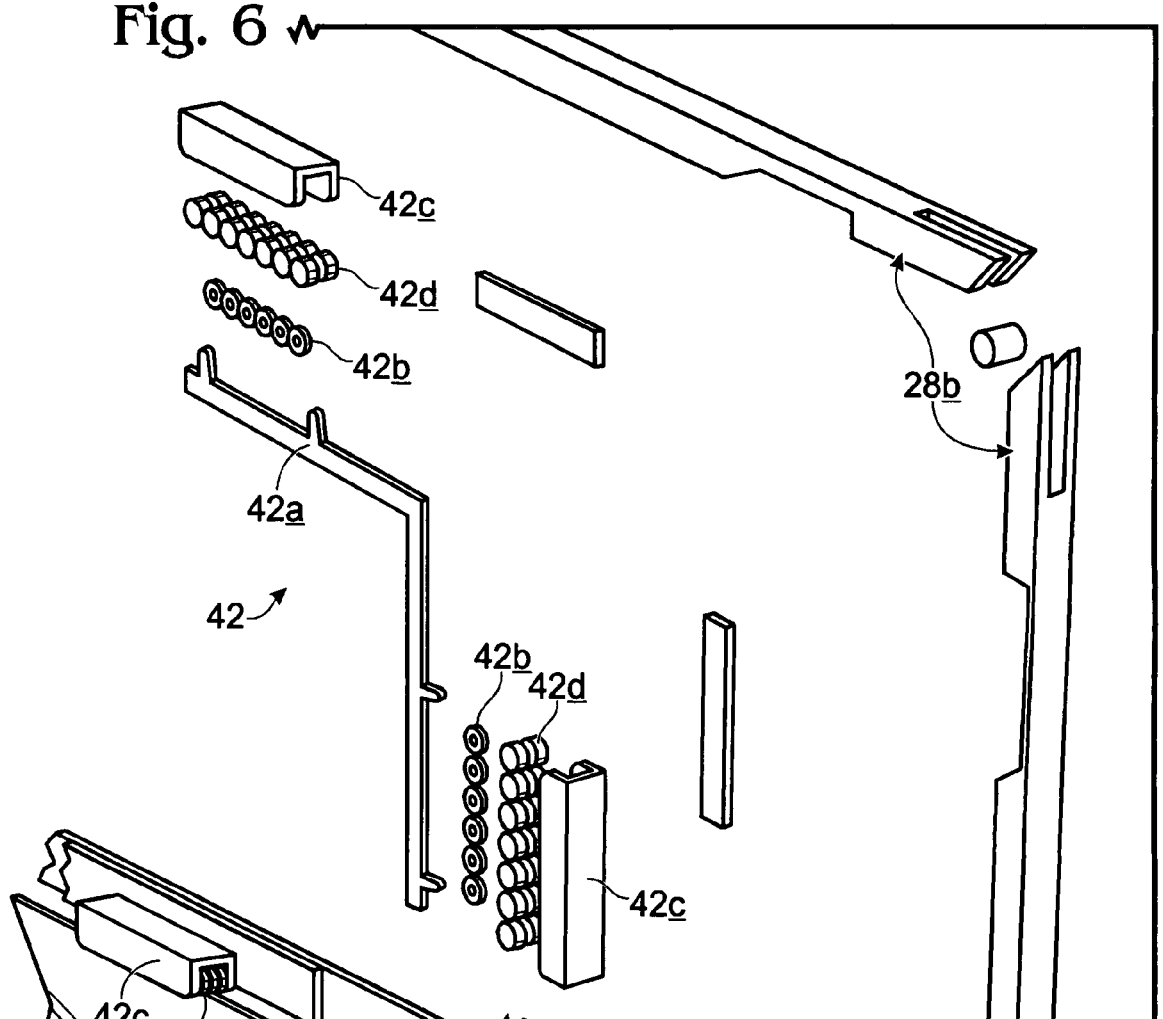
FIGS. 5, 6 and 7 illustrate, in several different ways, motor drive structure which is specifically employed in the screen structure shown in FIGS. 1 and 4 to create relative-motion optical diffusion based upon a pattern of motion created in accordance with what is shown generally in FIGS. 2 and 3.
Figure 5:
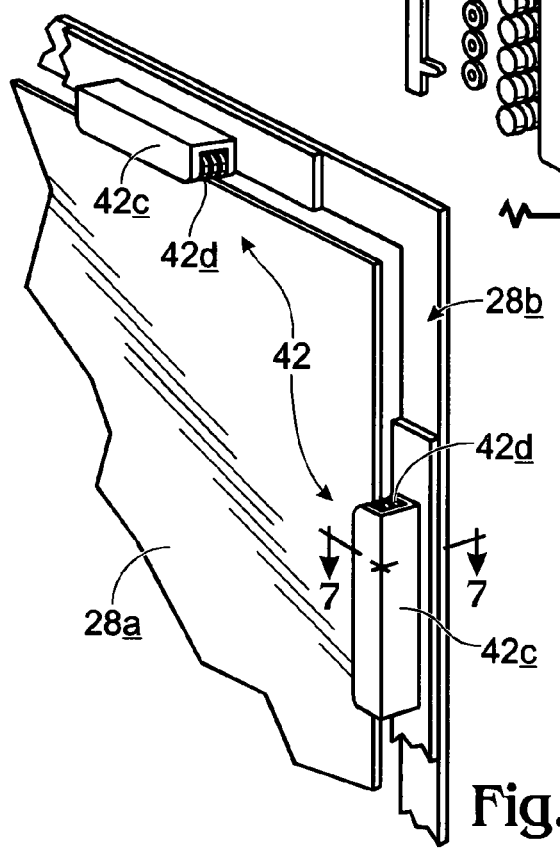
Figure 7:
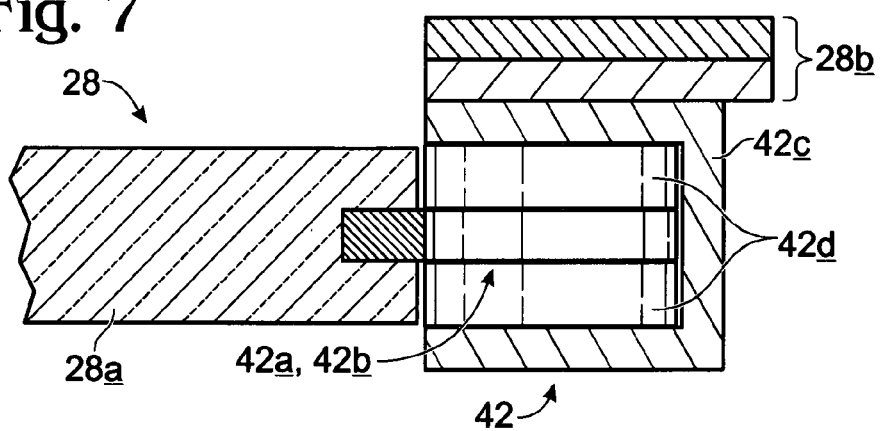

Turning attention now to the drawings, and beginning with FIGS. 1-3, inclusive, indicated generally at 20 in FIG. 1 is an anti-speckling laser-rear-projection system which includes an anti-speckling, laser-rear-projection screen structure 22 having front (image-viewing) and rear sides 22a, 22b, respectively. Screen structure 22, as will be seen, includes incorporated optical diffusion structure which is operable, in accordance with one preferred and best mode embodiment of, and manner of practicing, the present invention, to create, between sides 22a, 22b, and for anti-speckling purposes, what has been referred to hereinabove, as relative-motion laser-beam diffusion. In particular, screen structure 22 in system 20 is designed to produce what is referred to herein as relative-motion double diffusion in the practice of rear projection, toward a viewing screen 24, of laser-generated imagery coming from a laser-imagery source, such as that shown generally at 26. Projection from source 26 takes place in what, in system 20, is a forwardly projected laser-imagery beam which flows from the rear side 22b of screen structure 22 toward the front, image-viewing side 22a.

Included in screen structure 22, in accordance with one important embodiment of the invention, and progressing through this structure from the rear side thereof which is disposed appropriately closely adjacent laser source 26, is a Fresnel lens, or screen, or element, 28, and then a lenticular lens or screen, or element, 30 disposed appropriately closely adjacent the rear side of viewing screen 24. The Fresnel lens structure includes a generally planar Fresnel screen, or lens element, 28a which is suspended for relative motion, as will shortly be explained, within a generally planar frame structure 28b. Lenticular screen 30 is also generally planar in configuration, and possesses about the same lateral dimensionality as does the Fresnel lens structure.

In the particular embodiment of the invention now being described, the overall front-to-rear depth of rear projection system 20 might typically be about 5-inches, the height might be about 30-inches, the lateral width (measured normal to the plane of FIG. 1) about 53-inches, and the diagonal measure which is commonly used to describe the size a viewing surface, such as a television viewing surface, of about 62-inches. In fact, one may assume for the purpose of the description of the present invention that system 20 forms part of a rear-projection laser-based television structure.

Fresnel lens element 28a and lenticular lens 30 preferably offer different characteristics, or angles, of optical diffusion, with the diffusion angle of the Fresnel lens lying in the range of about +/−1.23-degrees, and the diffusion angle of the lenticular lens having a larger diffusion angle of about +/−45-degrees. A typical spacing between these two lens elements lies preferably within the range of about 6-millimeters to about 12-millimeters, with the Fresnel and lenticular lens elements per se each having a thickness lying somewhere in the range of about 0.5-millimeters to about 6.5-millimeters.

Operatively and optically interposed laser source 26 and screen structure 22 is a suitable, and preferably conventionally constructed, folding optical path structure which, in system 20, results in the delivery to the rear side of the Fresnel lens structure of a laser-generated image which occupies the entire area-expanse of that structure. This interposed folding optical path structure is not in any way related to the features of the present invention, may be entirely conventional in construction (as was just suggested), and accordingly, is not illustrated and/or described herein other than to make mention of it as being present in system 20.

Double diffusion occurs in screen structure 22 by virtue of the fact that there are two diffusion elements, i.e., structures 28a, 30, lying in a series fashion in the optical path extending between laser source 26 and viewing screen 24. Relative motion, within this context of double diffusion, takes place by virtue of the presence of a suitable electrically-energizable motor structure, soon to be more fully described, which operates with a driving interposition existing between Fresnel lens element 28a and Fresnel frame structure 28b. The specific motion which takes place to create relative-motion diffusion, as has been described earlier herein, is motion which effectively lies within the plane of lens element 28a. In other words, this motion effectively takes place within a plane which contains element 28a and which lies, therefore, in a plane that is disposed normally with respect to the plane of FIG. 1. Even more specifically, the particular relative motion having utility and importance herein is a kind of random and/or chaotic, non-angular relative motion involving motion of lens element 28a in a kind of laterally wobbling fashion in an infinite number of directions, and with a maximum displacement of about 0.3-mm to about 0.5-mm in any direction, within its own plane.

FIGS. 2 and 3 herein help to explain this useful relative motion. More specifically, FIG. 2 illustrates a point 28c which lies somewhere on the surface of lens element 28a. During relative-motion action, point 28c moves in a random and chaotic and non-angular wandering path, such as the winding path shown at 32 in FIG. 2.

FIG. 3, as was mentioned earlier in the description of this figure, illustrates two orthogonal vectors 34, 36 which generally illustrate the use of random-amplitude electrical-energizing, orthogonal, driving vectors that operate between lens element 28a and frame 28b to create the kind of motion pictured schematically by path 32 in FIG. 2.

While there are various kinds of motor structures which may be employed in the structure and practice of this invention, and while several of these kinds of motor structures are specifically mentioned hereinbelow, a preferred construction of such a motor structure takes the form of a generally frictionless motor structure formed by suitably operatively interactive coils and permanent magnets. In such a motor structure, the coils are electrically energized appropriately to create driving vectors, like vectors 34, 36, randomly to create the kind of motion described and pictured in and with regard to FIG. 2.

Before going into further detail with respect to one way of successfully constructing a screen structure like screen structure 22, it is noted here that, essentially, the core features of the present invention have thus been described simply with reference to what is illustrated in FIGS. 1-3, inclusive. Driving of lens element 28a in its own plane, and in a motion, as described in relation to FIGS. 2 and 3, which is relative to its own frame, and which is also relative to lenticular lens element 30, has been proven, through actual implementation of this invention, substantially completely to eliminate the laser-image speckling problem mentioned above herein.

Turning attention now to FIGS. 4-7, inclusive, here, in these several figures, and from a number of different points of view, a specific working embodiment of screen structure 22, as such has so far been described, is fully illustrated.

Thus, viewing screen 24 is bonded to the front side of Fresnel frame 28b through a perimeter ribbon 38 of very high bonding material—a conventionally available material referred to by the three capital letters VHB. Fresnel lens element 28a is suspended for relative motion within frame 28b through the appropriately bonded interposition of an arrangement of plural, spaced, very thin (a matter of choice) perimeter strips 40 of resilient elastomeric material, such as latex. Effectively, therefore, lens element 28a is floated for motion by strips 40 within the boundaries of frame 28b. Elements 40 are referred to individually herein also as spaced, resilient elastomers, and collectively as elastomeric structure.

Two electrical drive motor assemblies shown at 42, each of which has both orthogonal structural and orthogonal operational characteristics, are located as shown within structure 28. Specifically, they are located adjacent a pair of diagonally opposite corners in that structure. A careful look at FIGS. 4-7, inclusive, will provide a self explanatory revelation of the specific configurations of these motor structures. In particular, and considering the orthogonal natures of motor structures 42, each of these motor structures includes a right-angular subframe 42a having two, orthogonally disposed legs which carry respective rows of energizable coils 42b. These subframes and coils are suitably embedded in appropriate, orthogonally formed edge recesses that are provided in the relevant opposite diagonal corners in the main body of lens element 28a. The dimensionality of these subframe and coil components is such that they lie effectively within the thickness of element 28a.

Appropriately mounted through suitable holders 42c that are anchored to the relevant opposite diagonal corners of frame 28b, and forming portions of motor structures 42, are channel-rows of permanent magnets, such as those shown at 42d, which channel-rows effectively straddle each an associated row of the mentioned coils (i.e., the magnets 42d in each channel-row straddle the coils 42b in the associated row of coils).

With appropriate, random-waveform energizing of these just-described coils, utilizing varying amplitude electrical voltage and current vectors, such as previously mentioned vectors 34, 36, random, non-angular, and somewhat chaotic and unpredictable (from moment to moment) relative motion, such as that pictured in FIG. 2, takes place between Fresnel lens element 28a and frame 28b, such motion being accommodated resiliently by elastomeric strips 40. This motion is also relative to fixed lenticular lens element 30, and to the flow path of any laser-imagery beam passing through the screen structure toward viewing screen 24.

As was mentioned earlier, while the particular form of motor structure which has just been described and illustrated is considered to be a preferred motor structure owing to its remarkable simplicity, and to its generally frictionless operation, other kinds of motor structures may be employed if desired. Two such other kinds of motor structures might include, for examples, a cam-and-follower type, interactive motor structure, or an appropriate style of eccentric, rotary-wobble structure. Various other kinds of motor structures may of course be thought of by those generally skilled in the art, and may be appropriately employed for certain kinds of applications.

Figure 9:
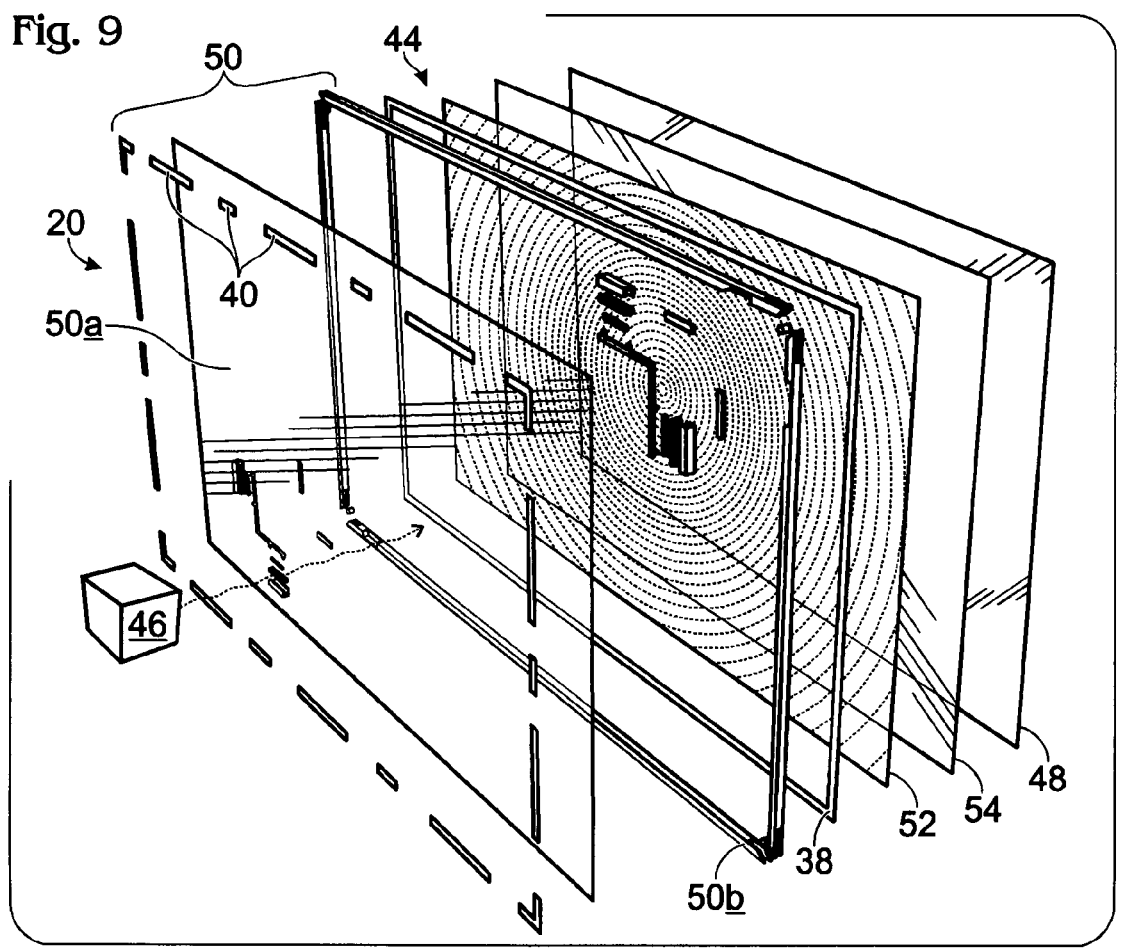
FIG. 9 is an exploded and partly fragmentary perspective illustration which illustrates details of a structural arrangement like that shown schematically in FIG. 8.

Turning attention now to FIGS. 8 and 9, here what is illustrated is a modified structural form of the invention which operates also with relative-motion double diffusion, and in particular with a type of included relative-motion double diffusion which forms part of an approach involving quadruple diffusion.

FIG. 8 illustrates this modified form of the invention which possesses a screen structure 44 that, accordingly, differs somewhat, in terms of its optical characteristics, from previously mentioned screen structure 22. Screen structure 44, which is also a rear-projection, relative-motion diffusion screen structure, operates in cooperation with a rear laser-imagery source 46 which is like previously mentioned source 26. Structure 44 lies optically intermediate laser 46 and a viewing screen 48, which viewing screen is like previously mentioned viewing screen 24.

Progressing from the rear toward the front of, and through, screen structure 44, this screen structure includes a generally planar double-diffusion lens, or screen, element 50a which, like previously mentioned Fresnel lens element 28a, is similarly suspended for relative motion within a supporting frame 50b. Collectively, components 50a, 50b make up what is referred to herein as a double-diffusion structure 50.

Disposed immediately on the front side of structure 50, in a positional order progressing toward viewing screen 48, are a Fresnel lens element 52, which is like previously mentioned Fresnel lens element 28a except that element 52 is a non-movable element, and then a lenticular screen element 54 which is like previously mentioned lenticular screen element 30.

Double-diffusion element 50a possesses, on each of its opposite faces, or surfaces, a selected form of a diffusion surface. These diffusion surfaces may be alike in nature or different. Typically, each surface will take the form either of a Fresnel structure, or of a lenticular structure. In structure 44, the rear face of element 50*a* has a Fresnel structure, and the front face, i.e., that face which is disposed more closely adjacent diffusion element 52, has a lenticular structure. Within element 50*a*, its two diffusion surfaces may be formed with like diffusion angles, or with different diffusion angles, depending upon application. If the diffusion angles associated with these two surfaces are different, it is preferred that the angle associated with the rear surface be smaller than that associated with the front surface.

Elements 52, 54 are also preferably formed with different diffusion angles, with that associated with element 52 be smaller diffusion angle than that associated with element 54.

It is well within the skill of those generally skilled in the relevant art, in constructing a rear-projection screen structure like screen structure 44, to determine and utilize just what kinds and natures of diffusion surfaces and diffusion-angle characteristics to associate with the opposite faces of element 50*a*, and with cooperative elements 52, 54. Selection of these parameters is not necessarily dictated by the features of the present invention, with the exception of the preference that has been stated which is that, in a double-diffusion or plural-diffusion construction, it is preferable that upstream diffusion angles, i.e., those associated with structures which are more closely adjacent a laser projection source, will be smaller, successively, than those associated with more downstream diffusion structures. In other words, it is preferable, where more than one diffusion element is included in a rear-projection screen structure constructed in accordance with the present invention, that diffusion angles become progressively larger as one moves forwardly in the structure.

From a brief study of FIG. 9 in relation to FIG. 8, and recalling the discussion which was presented with respect to FIGS. 4-7, inclusive, one can readily see how an embodiment of screen structure 44 may be assembled to result in such a modified structure which is capable of operating successfully with the central feature of this invention—relative-motive diffusion, relative-motion double-diffusion, relative-motion plural-diffusion, etc.

Accordingly, while two preferred and best mode embodiments of, and manners of practicing, the invention have been illustrated and described herein, with several different arrangements of plural diffusion elements discussed, and with several different motor drive structures for creating relative motion illustrated and/or explained, it is appreciated that other variations and modifications may come to the minds of those generally skilled in the art. In this context, it is intended that all such variations and modifications which embody the basic structure, features and operations of the present invention will come within the scopes of the following claims.

I claim:

1. Anti-speckling, rear-projection screen structure usable with a rearwardly disposed, from-the-rear-projection, laser-imagery source which is functional to produce, relative to said screen structure, a forwardly projected laser-imagery beam, said screen structure, in operative condition relative to such a source, comprising:
    front and rear sides disposed forwardly of the source;
    relative-motion optical diffusion structure disposed between said sides; and
    an actuator that controls said relative-motion optical diffusion structure to generate a relative motion of continuous, smoothly-changing, and non-cyclic nature.

2. The screen structure of claim 1, wherein said optical diffusion structure includes spaced, inter-cooperative, relative-motion optical diffusion instrumentalities co-operable to implement at least two stages of optical diffusion.

3. The screen structure of claim 2, wherein the mentioned at least two stages of optical diffusion are characterized by respective different angles of optical diffusion.

4. The screen structure of claim 1, wherein said optical diffusion structure includes spaced front and rear optical diffusion instrumentalities, with said front instrumentality taking the form of a lenticular lens structure, and said rear instrumentality taking the form of a Fresnel lens structure.

5. The screen structure of claim 4, wherein said rear instrumentality is characterized with one angle of optical diffusion, and said front instrumentality is characterized with a greater angle of optical diffusion.

6. The screen structure of claim 4, wherein said Fresnel lens structure includes a frame, a lens element edge-mounted on and for motion relative to said frame through resilient elastomer structure, and electrically energizable motor drive structure drivingly interposed between said frame and lens element energizable to create said relative motion therebetween.

7. The screen structure of claim 6, wherein said motor drive structure includes plural electrically energizable coils carried on said lens element, and plural permanent magnets disposed in cooperative, spaced relationship with reference to said coils and carried on said frame.

8. The screen structure of claim 4, wherein said Fresnel lens structure includes a frame, a lens element edge-mounted on and for motion relative to said frame through spaced, resilient elastomers, and electrically energizable motor drive structure drivingly interposed between said frame and lens element energizable to create said relative motion therebetween.

9. The screen structure of claim 1, wherein said optical diffusion structure includes at least a pair of relative-motion optical diffusion instrumentalities, and electrically energizable motor structure drivingly interposed between said instrumentalities, which motor structure is energizable to create said relative motion between the instrumentalities.

10. The screen structure of claim 9, wherein said relative-motion instrumentalities are generally planar and parallel-planar in nature, and said relative motion which is created between them by said motor structure takes place generally in a chaotic and endless-closed-loop fashion in a plane which generally parallels the planes of the two instrumentalities.

11. A rear-projection method for creating on the front, image-viewing side of a rear-projection screen structure an anti-speckled laser-beam-projected image comprising:
    projecting a source laser-image beam toward the rear side of such a screen structure, and
    while so projecting, introducing relative-motion optical diffusion in the laser beam path which exists between the source laser-image beam and the screen-structure's front, image-viewing side,
    wherein said step of introducing relative-motion optical diffusion includes producing relative motion in the laser beam path, wherein said relative motion is of a continuous, smoothly-changing, and non-cyclic nature.

12. The method of claim 11, wherein said introducing of relative-motion optical diffusion involves utilizing chaotic, random, relative motion.

13. The method of claim 11, wherein said introducing of relative-motion optical diffusion involves creating a condition of plural optical diffusions in the mentioned path.

14. The method of claim 11, wherein said introducing of relative-motion optical diffusion involves creating a condition of plural optical diffusions in the mentioned path via two, relatively moveable optical diffusion instrumentalities.

15. The method of claim 11, wherein the mentioned, introduced optical diffusion includes plural stages thereof produced on opposite faces of a common optical diffuser component which is placed into motion to achieve the mentioned condition of relative-motion optical diffusion.

16. The method of claim 11, wherein said introducing involves directing the laser beam path, in sequence, through (a) a moveable optical diffusion component which includes different optical diffusion surfaces formed on its opposite sides, (b) a Fresnel lens, and (c) a lenticular lens.

17. The method of claim 11, wherein said introducing of relative-motion optical diffusion involves utilizing relative motion which takes place generally transversely relative to the mentioned laser beam path.

* * * * *